July 24, 1956 W. L. SCHNELL 2,756,095
INSULATION PANELS FOR TRUCK BODIES
Filed Nov. 16, 1953 3 Sheets-Sheet 1
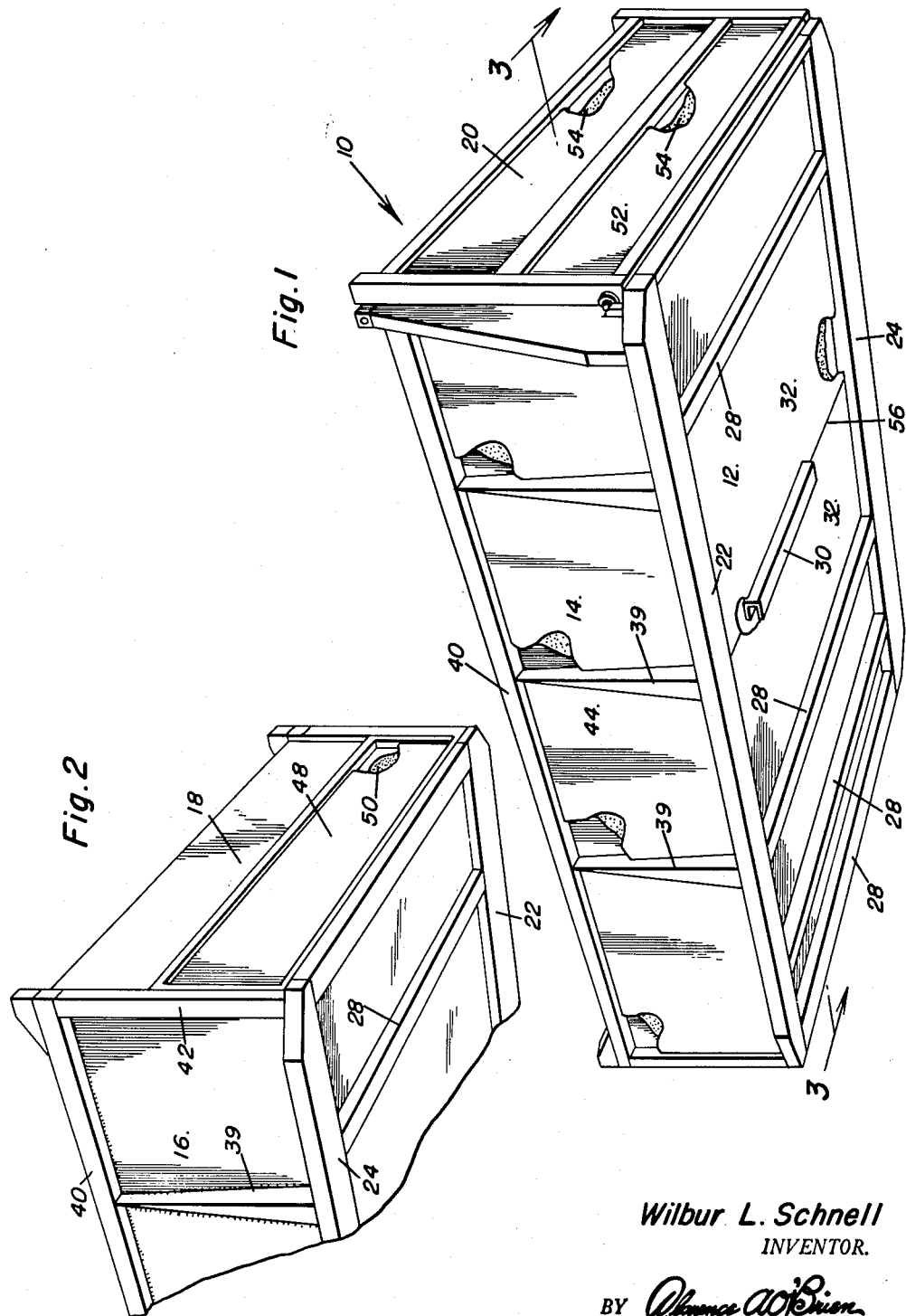
Wilbur L. Schnell
INVENTOR.
BY
Attorneys July 24, 1956    W. L. SCHNELL    2,756,095
INSULATION PANELS FOR TRUCK BODIES
Filed Nov. 16, 1953    3 Sheets-Sheet 2
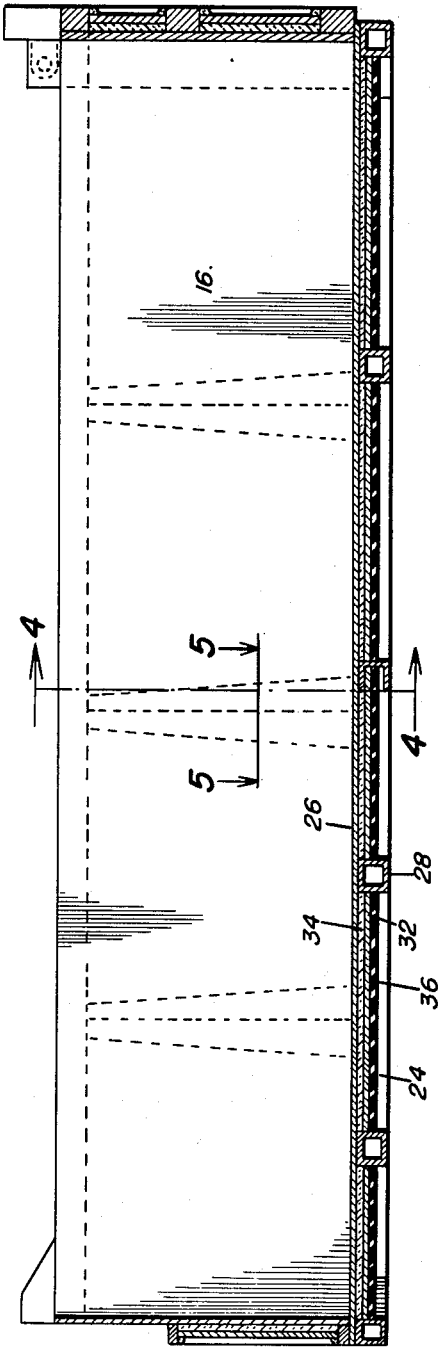
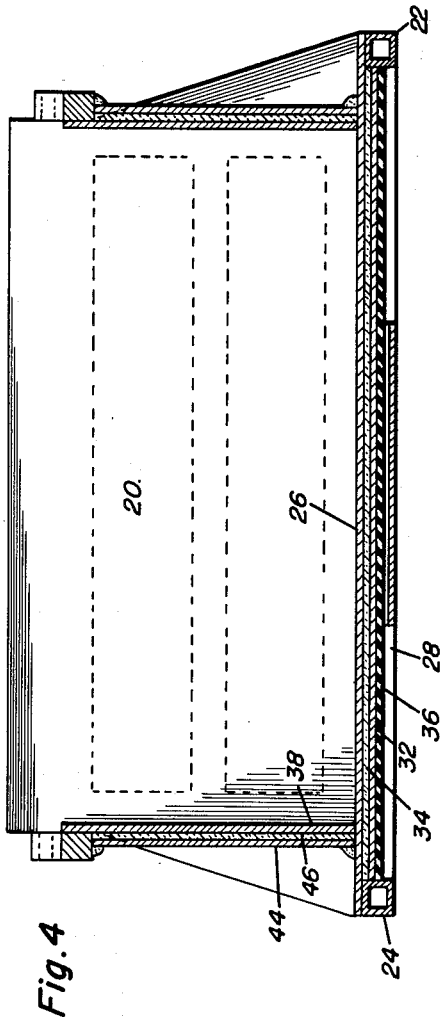
Wilbur L. Schnell
INVENTOR.
BY
Attorneys July 24, 1956   W. L. SCHNELL   2,756,095
INSULATION PANELS FOR TRUCK BODIES
Filed Nov. 16, 1953   3 Sheets-Sheet 3

Wilbur L. Schnell
INVENTOR.

BY *Clarence A. O'Brien*
*and Harvey B. Jacobson*
Attorneys

United States Patent Office 2,756,095
Patented July 24, 1956

2,756,095

INSULATION PANELS FOR TRUCK BODIES

Wilbur L. Schnell, Cadillac, Mich.

Application November 16, 1953, Serial No. 392,352

4 Claims. (Cl. 296—28)

This invention relates to the class of land vehicles and more particularly to a novel truck body having suitable insulation applied thereto.

The primary object of this invention resides in the provision of a novel truck body which is thermally insulated so that the truck body is especially adapted for the portation of bituminous concrete in a heated state or other similar asphalt products as are utilized in road building so that a minimum of the heat of the substance being carried in the truck body will be dissipated, thereby enabling more satisfactory roads to be constructed without necessitating reheating of the mix.

The construction of this invention features the concept of providing side panels along the sides, front and rear of the truck body, which panels are insulated from the side plates, frontal plates and rear plate, so as to provide a space for a suitable layer of insulation. Likewise, the bed of the truck is provided with insulation retaining plates which are spaced from the bottom panel of the bed so as to retain insulation therebetween. A coating of rubberized material is applied over the bottom surfaces of the bed, thereby ensuring against the corrosive action of chlorides and the like as are sometimes applied on roads during adverse weather conditions. It is to be recognized that this rubberized coating is highly essential since the action of such corrosive material is increased due to the heat supplied by the material being carried.

Still further objects and features of this invention reside in the provision of an insulative truck body that is strong and durable, simple in construction and monufacture, capable of being utilized for conversion of certain types of already existing trucks while also being adapted for new construction, and whose insulative characteristics are very satisfactory.

These, together with the various ancillary objects and features of the invention which will become apparent as the following description proceeds, are obtained by this insulative truck body, a preferred embodiment of which has been illustrated in the accompanying drawings, by way of example only, wherein:

Figure 1 is a perspective view of the insulative truck body comprising the present invention, with parts thereof being broken away for greater detail;

Figure 2 is a partial perspective view looking at the truck body from a different angle from that of the view shown in Figure 1;

Figure 3 is a vertical sectional view as taken along the plane of line 3—3 in Figure 1;

Figure 4 is a vertical sectional view as taken along the plane of line 4—4 in Figure 3;

Figure 5:
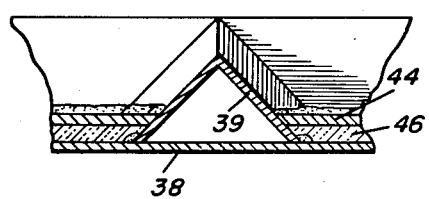
Figure 5 is a horizontal sectional detail view as taken along the plane of line 5—5 in Figure 3 and illustrating in greatest detail the tapering triangular-shaped construction of the hollow vertical members utilized to rigidify the side construction of the truck body.
Figure 7:
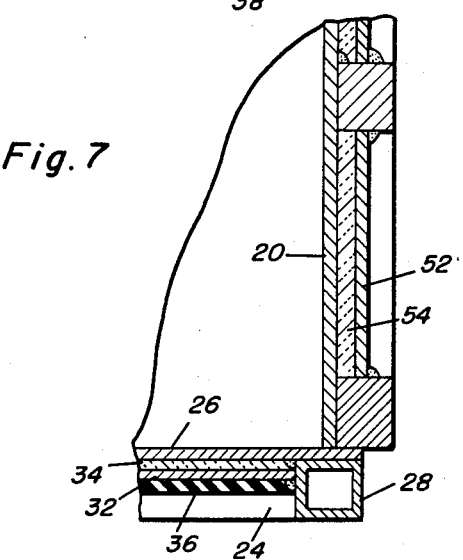
Figure 7 is a sectional detail view in an enlarged scale illustrating the construction of the rear portions of the truck body.
Figure 6:
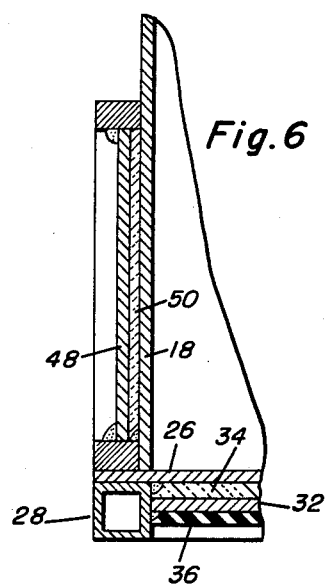
Figure 6 is a sectional detail view in an enlarged scale of the front portion of the truck body.
Figure 8:
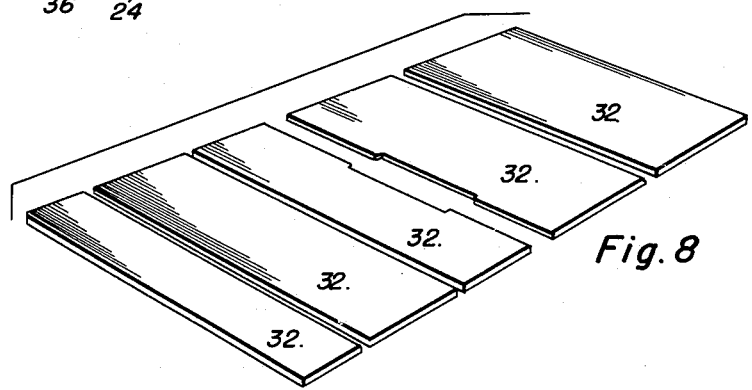
Figure 8 is a perspective view illustrating the construction of the insulation retaining plates which are attached to the bed of the truck body.
Figure 9:
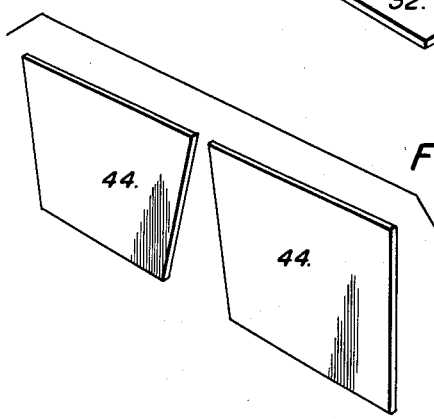
Figure 9 is a perspective view illustrating the construction of side panels which are adapted to extend between the spaced hollow vertical members.

With continuing reference to the accompanying drawings wherein like reference numerals designate similar parts throughout the various views, reference numeral 10 generally designates the insulative truck body comprising the present invention which includes a bed 12, a pair of sides 14 and 16, a front 18 and a tail gate 20.

The bed 12 includes a pair of hollow tubular longitudinal members 22 and 24 which are spaced from each other and to which there is attached in overlying position a bottom panel 26 by means of welding or the like. Also welded to the bottom panel 26 and to the longitudinal members 22 and 24 are tubular transverse members, as at 28. Welded to the underside of the panel 26 is a body supporting channel member 30. A plurality of insulation retaining plates 32 are welded at their peripheral edges to the transverse members 28, the longitudinal members 22 and 24, and are adapted to retain a layer of suitable insulative material, as at 34, therebetween. Then, after the plates 32 have been welded in position, a coating of suitable rubberized material, as at 36, is applied on the plates 32 using care that the joints or welds between the plates 32 and the various other members are properly covered with the coating so as to prevent deleterious action of corrosive elements at the welds which are especially receptive to the corrosive action.

It is to be noted that the tubular transverse members 28 coact with the insulation 34 to reduce the amount of heat transfer by reducing the area of direct path across metallic elements that heat may travel by conduction. The air spaces in the tubular members form highly effective heat barriers.

The side panels 14 and 16 are constructed similarly, and each includes inner side plates as at 38 which are secured to the longitudinal members 22 and 24. A plurality of triangular wedge-shaped and tapering vertical and hollow members 39 are secured to the upper surfaces of the longitudinal frame members 22 and 24 and taper upwardly. Supported by these vertical members 39 are upper tubular members 40. Suitable tubular members 42 are secured at the front ends of the inner side plates 38 as are rear tubular members which are located adjacent the tail gate 20. Spaced between the inner side plates 38 and outer side panels 44 is suitable insulation 46. The side panels 44 are welded about their peripheral edges to the vertical members 39, the longitudinal frame members 22 and 24, and the upper tubular members 40.

The front end 18 of the truck body is suitably insulated by having a front panel 48 welded to the frame members of the front 18 along its peripheral edges so as to retain a layer of insulation 50 therebetween. Likewise, the tail gate is suitably insulated by having rear panels 52 welded to the frame members of the tail gate 20 along their peripheral edges so as to retain insulation 54 between the rear panels and the inner plate of the tail gate 20.

It is noted that the construction of this invention thereby incorporates a minimum of a path for direct heat transfer and thus provides thorough insulation for the truck body. It is noted that two of the bottom insulation retaining plates 32 may be welded to each other to form a joint as at 56 adjacent the bed supporting channel member 30.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In an insulated truck body, an insulated bed comprising a pair of spaced hollow tubular longitudinal body frame members, transverse hollow tubular frame members secured to said longitudinal frame members and extending therebetween, a bottom panel secured to and overlying said longitudinal frame members and said transverse frame members, insulation retaining plates each having their peripheral edges secured to said longitudinal frame members and a pair of adjacent transverse frame members, said plates being spaced from said panel, and a layer of insulation between said plates and said panel, insulative sides carried by said bed, each of said sides including inner side plates secured to said longitudinal body frame members, hollow vertical members secured to said inner side plates and rising therefrom, said vertical members being secured to said longitudinal body frame members, an upper tubular member secured to and carried by said vertical members, side panels secured at their peripheral edges to said longitudinal frame members, said upper tubular member, and said vertical members, and insulative material between said inner side plates and said side panels.

2. In an insulated truck body, an insulated bed comprising a pair of spaced hollow tubular longitudinal body frame members, transverse hollow tubular frame members secured to said longitudinal frame members and extending therebetween, a bottom panel secured to and overlying said longitudinal frame members and said transverse frame members, insulation retaining plates each having their peripheral edges secured to said longitudinal frame members and a pair of adjacent transverse frame members, said plates being spaced from said panel, and a layer of insulation between said plates and said panel, and a rubber-like coating underlying the bottom surfaces of said bed, insulative sides carried by said bed, each of said sides including inner side plates secured to said longitudinal body frame members, hollow vertical members secured to said inner side plates and rising therefrom, said vertical members being secured to said longitudinal body frame members, an upper tubular member secured to and carried by said vertical members, side panels secured at their peripheral edges to said longitudinal frame members, said upper tubular member, and said vertical members, and insulative material between said inner side plates and said side panels.

3. In an insulated truck body, an insulated bed comprising a pair of spaced hollow tubular longitudinal body frame members, transverse hollow tubular frame members secured to said longitudinal frame members and extending therebetween, a bottom panel secured to and overlying said longitudinal frame members and said transverse frame members, insulation retaining plates each having their peripheral edges secured to said longitudinal frame members and a pair of adjacent transverse frame members, said plates being spaced from said panel, and a layer of insulation between said plates and said panel, insulative sides carried by said bed, each of said sides including inner side plates secured to said longitudinal body frame members, hollow vertical members secured to said inner side plates and rising therefrom, said vertical members being secured to said longitudinal body frame members, an upper tubular member secured to and carried by said vertical members, side panels secured at their peripheral edges to said longitudinal frame members, said upper tubular member, and said vertical members, and insulative material between said inner side plates and said side panels, said vertical members being of pyramidal-shape and tapering upwardly.

4. In an insulated truck body, an insulated bed comprising a pair of spaced hollow tubular longitudinal body frame members, transverse hollow tubular frame members secured to said longitudinal frame members and extending therebetween, a bottom panel secured to and overlying said longitudinal frame members and said transverse frame members, insulation retaining plates each having their peripheral edges secured to said longitudinal frame members and a pair of adjacent transverse frame members, said plates being spaced from said panel, and a layer of insulation between said plates and said panel, and a rubber-like coating underlying the bottom surfaces of said bed, insulative sides carried by said bed, each of said sides including inner side plates secured to said longitudinal body frame members, hollow vertical members secured to said inner side plates and rising therefrom, said vertical members being secured to said longitudinal body frame members, an upper tubular member secured to and carried by said vertical members, side panels secured at their peripheral edges to said longitudinal frame members, said upper tubular member, and said vertical members, and insulative material between said inner side plates and said side panels, said vertical members being of pyramidal-shape and tapering upwardly.

References Cited in the file of this patent

UNITED STATES PATENTS

| | | |
|---|---|---|
| 754,039 | Ball | Mar. 8, 1904 |
| 1,022,951 | Josz | Apr. 9, 1912 |
| 1,139,456 | Ledwinka | May 11, 1915 |
| 1,942,207 | Ferwerda | Jan. 2, 1934 |

OTHER REFERENCES

"Heil Insulated Steel Asphalt Body Model 70," The Heil Co., Catalog No. 140, received March 7, 1925, page 16; The Heil Co., Milwaukee, Wisconsin.